No. 718,776. PATENTED JAN. 20, 1903.
E. LEVY & L. IRENS.
NUT LOCK.
APPLICATION FILED OCT. 21, 1902.
NO MODEL.
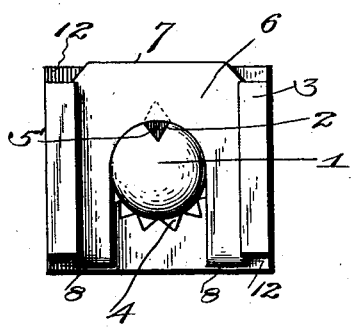
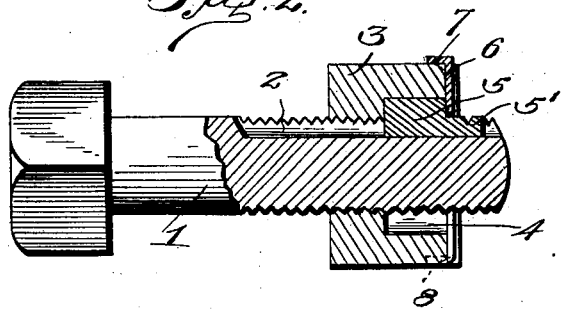 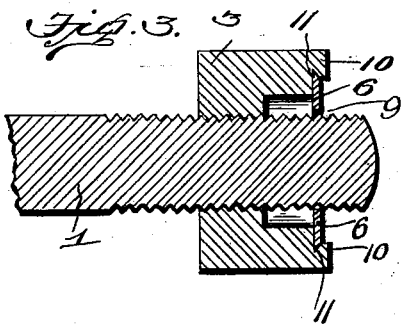
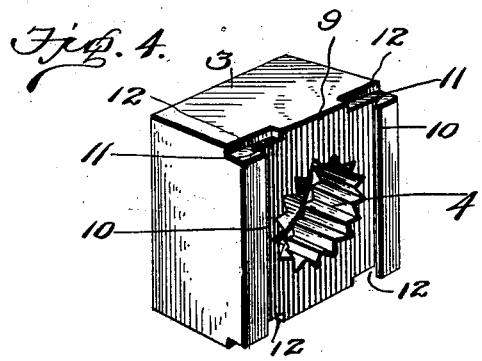
Inventors
Edward Levy
Louis Irens
Witnesses
By
Attorneys

UNITED STATES PATENT OFFICE.

EDWARD LEVY AND LOUIS IRENS, OF CHATHAM, MICHIGAN.

NUT-LOCK.

SPECIFICATION forming part of Letters Patent No. 718,776, dated January 20, 1903.

Application filed October 21, 1902. Serial No. 128,136. (No model.)

*To all whom it may concern:*

Be it known that we, EDWARD LEVY and LOUIS IRENS, citizens of the United States, residing at Chatham, in the county of Alger and State of Michigan, have invented certain new and useful Improvements in Nut-Locks; and we do declare the following to be a full, clear, and exact description of the invention, such as will enable others skilled in the art to which it appertains to make and use the same.

This invention relates to certain new and useful improvements in nut-locks.

The object of the invention is to provide a nut-lock which is simple of construction, durable in use, comparatively inexpensive of production, and adapted to securely hold the nut from turning after it has been screwed home on the bolt.

With this and other objects in view the invention consists of certain novel features of construction, combination, and arrangement of parts, as will be more fully described, and particularly pointed out in the appended claims.

In the accompanying drawings, Figure 1 is a front or end elevation of a bolt and nut locked together by our invention. Fig. 2 is a longitudinal section through the bolt and nut on the line of the groove and key. Fig. 3 is a longitudinal horizontal section of the locking end of the bolt shown in Fig. 2. Fig. 4 is a perspective view of the nut detached.

Referring now more particularly to the drawings, the numeral 1 represents a bolt provided in its threaded shank with a longitudinal groove 2, and 3 is a nut applied to the bolt and having the inner portion of its bore formed with threads to engage the shank of the bolt and the outer portion of its bore formed with a series of longitudinal grooves 4. After the nut has been applied to the bolt and screwed up to the desired place a sliding key 5, of a form corresponding to the grooves in the bolt and nut, is inserted in the groove 2 and the groove 4, which alines therewith, to hold the nut against retrograde rotation. Preferably the grooves 2 and 4 are of V form, and the key is of a corresponding shape to slidably fit therein, and the outer end of the key is provided with a reduced portion 5', provided with a nick or groove to enable it to be readily withdrawn when required by a suitable form of tool. In order to hold the key securely in position against displacement, we provide a cover to hold it against outward endwise movement, said cover being constructed and applied to the nut in the following manner: The cover 6 is substantially of U form and is provided upon its body portion with a bendable flange or projection 7 and has its arms of such length that when applied to the nut the extremities thereof may be turned down to form locking bends or projections 8. The nut 3 is provided in its top or outer face with a recess 9, bounded on opposite sides by shoulders 10, which are formed with dovetailed grooves 11, in which the cover 6 is slidably mounted. The sides of the nut, which are diametrically opposite each other and at right angles to the sides on which the shoulders 10 are formed, are provided on opposite sides of their centers with recesses 12 to receive the said locking bends or projections 8. The cover may be applied from either of the said recessed sides of the nut, and in applying it the arms thereof are inserted into the ends of the grooves 11 at one side of the nut and slid along said grooves until the cover occupies the position shown clearly in Figs. 1 and 2, when the flange 7 is bent at right angles to bear upon one side of the nut at a point between the recesses 12 and the free ends of the arms of the cover are bent at right angles to form the locking projections 8, which are inserted in the recesses 12 from the opposite side of the nut, whereby the cover will be held from displacement in one direction by the flange 7 and from displacement in the opposite direction by the bends or projections 8. The cover when applied conceals or covers the grooves 4 on one side of the nut and prevents outward displacement of the key 5, whereby turning of the nut upon the bolt is prevented. Should for any reason it be desired to remove the nut from the bolt, this may be accomplished by bending the projections 8 out in alinement with the arms of the cover, withdrawing said cover from the dovetailed grooves 11, and removing the key 5, whereupon the nut may be unscrewed from the bolt.

Various changes in the form, proportion, and the minor details of construction may be resorted to without departing from the principle or sacrificing any of the advantages of this invention.

Having thus described our invention, what we claim as new, and desire to secure by Letters Patent, is—

1. The combination with a bolt provided with a longitudinal groove, of a nut having a portion of its bore formed with screw-threads and the remainder of its bore formed with an annular series of grooves, a key inserted in the groove in the bolt and one of the grooves in the nut to hold the nut against turning, and a cover applied to the nut to hold the key against displacement, substantially as described.

2. The combination with a bolt provided with a longitudinal groove, of a nut having a portion of its bore threaded to engage the bolt and the remaining portion of the bore formed with an annular series of grooves, the outer face of the nut being provided with dovetailed grooves, and one of its sides with recesses, a key inserted in the groove of the bolt and one of the grooves of the nut to hold the latter against retrograde rotation, and a U-shaped cover slidably mounted in the dovetailed grooves and having its slotted portion provided with a flange to engage one side of the nut, and the free ends of said arms bent down to engage the said recesses in the nut, said cover serving to hold the key against displacement, substantially as shown and described.

In testimony whereof we have hereunto set our hands in presence of two subscribing witnesses.

EDWARD LEVY.
LOUIS IRENS.

Witnesses:
WOODBERRY WALLS,
WALTER GRANGER.